「12」 United States Patent
Park et al.

(10) Patent No.: US 11,322,950 B2
(45) Date of Patent: May 3, 2022

(54) METHOD FOR OPERATING ESS AT OPTIMAL EFFICIENCY (71) Applicant: HYOSUNG HEAVY INDUSTRIES CORPORATION, Seoul (KR)

(72) Inventors: Sang Hui Park, Anyang-si (KR); Geon Ho An, Incheon (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 428 days.

(21) Appl. No.: 16/467,079

(22) PCT Filed: Dec. 6, 2017

(86) PCT No.: PCT/KR2017/014229
§ 371 (c)(1),
(2) Date: Jun. 6, 2019

(87) PCT Pub. No.: WO2018/106014
PCT Pub. Date: Jun. 14, 2018

(65) Prior Publication Data
US 2019/0319464 A1    Oct. 17, 2019

(30) Foreign Application Priority Data
Dec. 9, 2016  (KR) .................. 10-2016-0167977

(51) Int. Cl.
H02J 7/00    (2006.01)
H02J 3/32    (2006.01)

(52) U.S. Cl.
CPC .............. H02J 7/0021 (2013.01); H02J 3/32 (2013.01)

(58) Field of Classification Search
CPC ...................................... H02J 3/322
See application file for complete search history.

(56) References Cited

U.S. PATENT DOCUMENTS 9,559,521 B1 *  1/2017  King .................. G05F 1/66
11,025,063 B2 *  6/2021  Triebel .............. H02J 3/16
(Continued)

FOREIGN PATENT DOCUMENTS

EP    2966751 A1    1/2016
KR    10-2012-0136114 A    12/2012
(Continued)

OTHER PUBLICATIONS

WO-2015102396 translation Method and apparatus for distributing power in energy storage system, Jin Bo Gun (Year: 2015).*

Primary Examiner — Drew A Dunn
Assistant Examiner — Tynese V McDaniel
(74) Attorney, Agent, or Firm — Novick, Kim & Lee, PLLC; Jae Youn Kim (57) ABSTRACT A method of operating an ESS with optimal efficiency includes: collecting charge/discharge efficiency data of a PCS; collecting charge/discharge efficiency data of a battery depending on current state of charge of the battery; creating charge/discharge efficiency data of a unit BESS including the PCS and the battery by using the collected data; determining optimal charge/discharge levels of at least two unit-BESSs included in the ESS by using charge/discharge efficiency data of the at least two unit-BESSs to satisfy commanded input/output power values of the whole ESS at a current point of time; and charging or discharging the at least two unit-BESSs depending on the determined optimal charge/discharge power values.

5 Claims, 9 Drawing Sheets (56) References Cited

U.S. PATENT DOCUMENTS

| | | | | |
|---|---|---|---|---|
| 2005/0234599 | A1* | 10/2005 | Kurokami | H02J 3/32 700/286 |
| 2014/0118423 | A1* | 5/2014 | Hasegawa | G09G 3/3607 345/690 |
| 2014/0303821 | A1* | 10/2014 | Oda | B60L 58/30 701/22 |
| 2014/0320083 | A1* | 10/2014 | Masuda | H01M 10/44 320/109 |
| 2015/0268370 | A1* | 9/2015 | Johnston | B82Y 30/00 324/346 |
| 2016/0020613 | A1* | 1/2016 | Kimura | H02J 3/381 307/52 |
| 2016/0218551 | A1* | 7/2016 | Sano | H02S 40/30 |
| 2016/0322845 | A1* | 11/2016 | Lueth | H02J 7/0068 |
| 2016/0334821 | A1* | 11/2016 | Lee | H02J 3/32 |
| 2016/0346922 | A1* | 12/2016 | Shelton | H02J 7/0013 |
| 2016/0352111 | A1* | 12/2016 | Arita | H01M 10/4207 |
| 2017/0063090 | A1* | 3/2017 | Wienboeker | H02J 3/32 |
| 2017/0170684 | A1* | 6/2017 | Matthey | H02J 13/0003 |
| 2017/0237260 | A1* | 8/2017 | Rhie | H02J 13/0006 307/72 |
| 2017/0256952 | A1* | 9/2017 | Sugahara | G06Q 50/06 |
| 2017/0307461 | A1* | 10/2017 | Van Bekkum | G01F 23/0076 |
| 2017/0324246 | A1* | 11/2017 | Sato | H01M 10/44 |
| 2017/0373501 | A1* | 12/2017 | Okamoto | H02J 7/32 |
| 2018/0076637 | A1* | 3/2018 | Shiraki | H02J 7/0013 |
| 2018/0233910 | A1* | 8/2018 | Kubota | H02J 3/46 |
| 2019/0067945 | A1* | 2/2019 | Hierl | H02J 3/387 |
| 2019/0181644 | A1* | 6/2019 | Chae | H02J 9/08 |
| 2019/0190400 | A1* | 6/2019 | Vanderzaden | H02J 3/381 |
| 2019/0267809 | A1* | 8/2019 | Cho | H02J 9/06 |
| 2019/0334346 | A1* | 10/2019 | Kawai | H02J 3/46 |
| 2020/0069463 | A1* | 3/2020 | Chen | A61B 5/398 |
| 2020/0091726 | A1* | 3/2020 | Bhowmik | H02J 13/0003 |
| 2020/0185958 | A1* | 6/2020 | Kim | F24F 11/47 |
| 2020/0295567 | A1* | 9/2020 | Won | H02J 9/06 |
| 2020/0309860 | A1* | 10/2020 | Arima | G01R 31/3648 |
| 2020/0321880 | A1* | 10/2020 | Lee | H02H 7/12 |
| 2021/0159715 | A1* | 5/2021 | Agamy | H02J 1/10 |

FOREIGN PATENT DOCUMENTS

| | | | |
|---|---|---|---|
| KR | 10-2013-0024763 A | 3/2013 | |
| KR | 10-2013-0167734 B1 | 12/2013 | |
| KR | 10-1337576 B1 | 12/2013 | |
| KR | 10-2015-0080169 A | 7/2015 | |
| KR | 10-2015-0106912 A | 9/2015 | |
| WO | WO-2015102396 A1 * | 7/2015 | H02J 3/32 |
| WO | 2018/106014 A1 | 6/2018 | |

* cited by examiner

METHOD FOR OPERATING ESS AT OPTIMAL EFFICIENCY

FIELD OF THE INVENTION

The present invention relates to a method of operating an energy storage system or ESS with optimal efficiency; and more particularly to, the method of operating the ESS with at least two unit-BESSs, with optimal efficiency, that distributes power.

BACKGROUND OF THE INVENTION

An energy storage system or ESS refers to a system for using energy effectively by storing remaining energy in a power grid and using the energy at a required time. In general, it may contribute to optimization of power quality through load leveling and frequency control by storing idle power at a time of encountering less load like nighttime and using the power at a time of encountering much load like daytime.

The ESS is expected to perform a core function of converting now actively developed new and renewable energy sources into high quality of power and then linking them to a power network. In particular, it is a system required to link a wind power generation system and a solar power generation system with high output volatility to the power grid.

A principle of storing energy is to receive electric energy from a power grid, store it as ionized, kinetic, physically compressional, and chemical energy, convert it to electric energy at a required time, and supply it to a power grid. Medium and large ESSs may be classified into various types. A lithium-ion battery is a typical secondary battery with a separators and electrodes between anode and cathode in which lithium ions store and discharge energy while moving. Yet, it is less economical but thanks to good output characteristics and great efficiency, it has been recently widely used. Particularly, a method of forming a whole ESS with one battery pack and a plurality of unit-BESSs composed of lithium ion batteries for one destination site makes up for its disadvantages of being less economical and having a shorter life of the lithium-ion battery.

To distribute charged/discharged power of the whole ESS comprising multiple unit-BESSs, a different solution from such ESS with one battery pack, however, is needed.

DETAILED EXPLANATION OF THE INVENTION

Technical Problem

An object of the present invention is to provide a method of operating an ESS with optimal efficiency that optimizes output distribution by considering efficiency of a PCS and that of a battery under different situations. More specifically, it is to propose an algorithm for optimizing output distribution by taking into account efficiency of a PCS and that of a battery under each of different situations because the efficiency of the PCS changes by up to 12% depending on its output and that of the battery changes by up to 25% depending on its SOC.

In particular, another object of the present invention is to provide a method of operating an ESS composed of a plurality of unit-BESSs with optimal efficiency to optimize output distribution of each unit BESS for one destination site.

The other object of the present invention is to provide a method of making efficiency of SOC and output based on efficiency data of a PCS and a battery, linearizing them by each section, finding an energy optimization point depending on input/output command values and the number of operating units for operation.

Means of Solving the Problem

A method of operating an ESS with optimal efficiency in accordance with one example embodiment of the present invention may comprise steps of: collecting charge/discharge efficiency data of a PCS; collecting charge/discharge efficiency data of a battery depending on current state of charge of the battery; creating charge/discharge efficiency data of a unit BESS including the PCS and the battery by using the collected data; determining optimal charge/discharge levels of at least two unit-BESSs included in the ESS by using charge/discharge efficiency data of the at least two unit-BESSs to satisfy commanded input/output power values of the whole ESS at a current point of time; and charging or discharging the at least two unit-BESSs depending on the determined optimal charge/discharge power values.

Herein, the step of creating charge/discharge efficiency data of a unit BESS may include steps of: dividing a current-SOC section of batteries included in the unit-BESSs into multiple current-SOC subsections; and drawing a relationship between target-SOC of the battery and charge/discharge efficiency of the unit-BESSs by combining a relationship between the target-SOC of the battery and charge/discharge efficiency of the battery with that between the target-SOC of the battery and charge/discharge efficiency of the PCS in charge of the battery with respect to the individual current-SOC subsections.

Herein, the step of creating charge/discharge efficiency data of a unit BESS may further include steps of: dividing a charge/discharge efficiency level section in the relationship between the target-SOC of the battery and the charge/discharge efficiency of the unit-BESSs into multiple subsections; and linearizing the relationship between the target-SOC of the battery and the charge/discharge efficiency of the unit-BESSs in the multiple subsections.

Herein, at the step of determining optimal charge/discharge levels of at least two unit-BESSs, optimal charge/discharge levels of the at least two unit-BESSs may be determined by using the linearized relationships between the target-SOC of the battery and the charge/discharge efficiency of the unit-BESSs in the multiple subsections with respect to the individual current-SOC subsections corresponding to the current-SOC of the battery at a specific point of time.

Herein, the step of determining optimal charge/discharge levels of at least two unit-BESSs may determine optimal charge/discharge levels in accordance with equations as shown below.

Herein, a step of receiving input/output power values of the whole ESS at a current point of time and obtaining information on current charge/discharge levels of batteries equipped in the at least two unit-BESSs at the current point of time may be further included.

Herein, after the step of charging or discharging the unit-BESSs, a step of receiving input/output power values of the whole ESS at a next time and obtaining information on current charge/discharge levels of batteries equipped in the at least two unit-BESSs at the next time may be performed and return to the step of determining optimal charge/discharge levels of at least two unit-BESSs.

A method of operating an ESS with optimal efficiency in accordance with another example embodiment of the present invention, as a method of creating charge/discharge efficiency data of each of multiple unit-BESSs in an ESS equipping the multiple unit EBSSs composed of PCSs and batteries, may comprise steps of: collecting charge/discharge efficiency data of the PCS; collecting charge/discharge efficiency data of a battery depending on current-SOC of the battery; dividing a current-SOC section of the collected charge/discharge efficiency data of the battery into multiple current-SOC subsections; drawing a relationship between target-SOC of the battery and charge/discharge efficiency of the unit-BESSs by combining a relationship between the target-SOC of the battery and charge/discharge efficiency of the battery with that between the target-SOC of the battery and charge/discharge efficiency of the PCS in charge of the battery with respect to the individual current-SOC subsections; dividing a charge/discharge efficiency level section in the relationship between the target-SOC of the battery and the charge/discharge efficiency of the unit-BESSs into multiple subsections; and linearizing the relationship between the target-SOC of the battery and the charge/discharge efficiency of the unit-BESSs in the multiple subsections.

Herein, after the step of linearizing, it may further perform a step of forming a table by parameterizing the linearized straight line.

Effects of the Invention

In accordance with the embodiment of the present invention, a method of operating an ESS with optimal efficiency with the aforementioned configuration has an advantage of optimizing output distribution in consideration of efficiency of a PCS and a battery by situation.

In addition, the present invention has an advantage of saving internal output of a battery and improving usage of a whole ESS by using an optimal distribution algorithm and optimizing efficiency in consideration of efficiency.

Besides, the present invention has an advantage of optimizing output distribution for individual BESSs which are equipped in the ESS at a destination site.

Furthermore, the present invention has a benefit of being capable of flexibly handling against any removal of a PCS due to its breakdown upon adding a new PCS when a PMS performs the algorithm.

Moreover, the present invention also gives an operator of an ESS effective operation and profit approximately 10% more than the existing ones.

DETAILED DESCRIPTION OF THE PREFERRED EMBODIMENTS

Detailed example embodiments to implement the present invention will be explained below by referring to attached drawings.

Upon explanation of the present invention, terms such as "a first," "a second," etc. may be used to explain a variety of components but the components may not be limited by such terms. The terms are used only for the purpose of distinguishing one component from another. For example, a first component may be named as a second component without being beyond the scope of the right of the present invention and similarly, even a second component may be named as a first one.

If it is mentioned that a component is connected or linked to another component, it may be understood that the component may be directly connected or linked to the another component but also a third component may exist in between them.

The terms used in this specification are used only to explain specific example embodiments and they are not intended to limit the present invention. Unless a context clearly indicates a different meaning, any reference to singular may include plural ones.

In this specification, it may be understood: that terms such as "include," or "equip" are intended to designate that features, numbers, steps, movements, components, parts, or their combinations exist; and that existence or addibility of one or more other features, numbers, steps, movements, components, parts, or their combinations are not excluded in advance.

For example, a battery used in an ESS may have a plurality of battery racks, each of which has a plurality of battery modules, but for convenience of explanation, it will be assumed that it has multiple battery modules (or cells).

For clearer explanation, shapes, sizes, etc. of elements in drawings, moreover, may be exaggerated clearer explanation.

A method of operating an ESS with optimal efficiency in accordance with ideas of the present invention is for an ESS composed of at least two unit-BESSs, each of which has one unit-battery block and one PCS.

In accordance with the embodiment, with respect to the PCS, each PCS may be equipped for each unit BESS or one PCS may be equipped integratively for the ESS or integratively for multiple unit BESS. However, when the idea of the present invention is achieved, the PCS plays a role in providing only efficiency level of the PCS depending on input/output levels. Therefore, the idea of the present invention may be applied in the integrated PCS on assumption that the PCS with the same efficiency level is equipped in each unit BESS. In the explanation below, it is specified that one PCS is equipped for each unit BESS but it is natural that even one integrated PCS equipped is in the scope of rights of the present invention.

For convenience, a unit battery block equipped by each unit BESS will be referred to as a battery.

Figure 1:
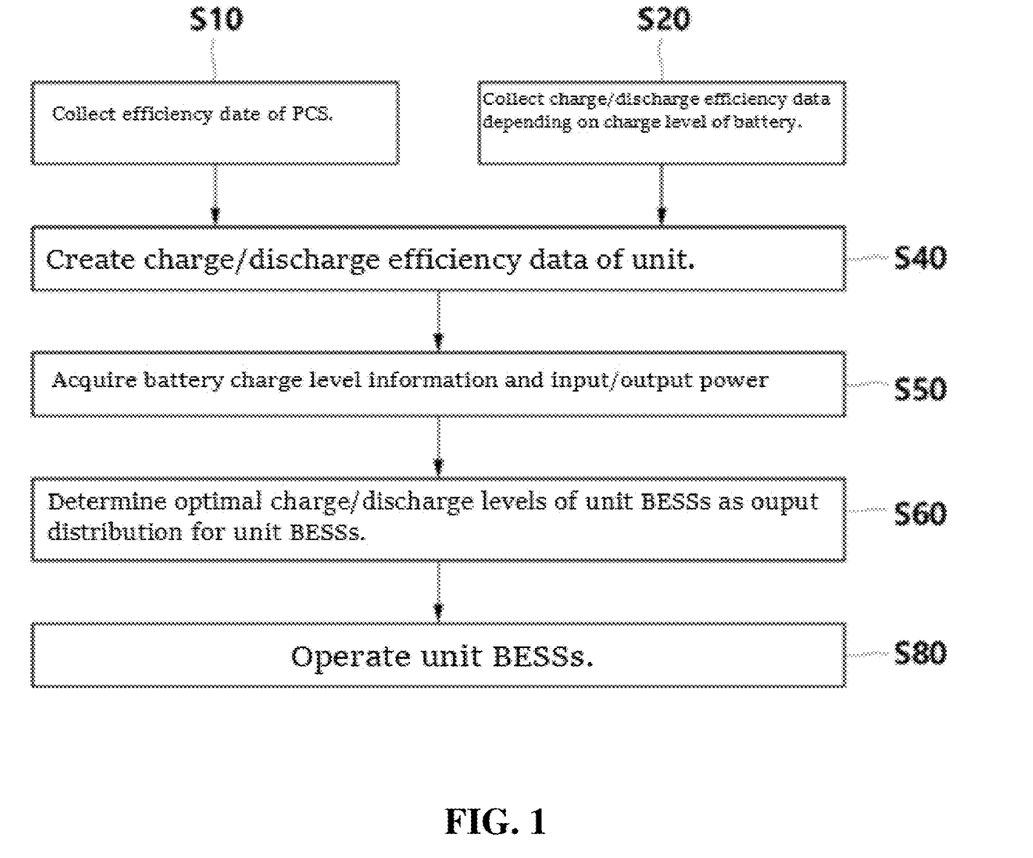
FIG. 1 is a flow chart illustrating a method of operating an ESS with optimal efficiency in accordance with one example embodiment of the present invention.

FIG. 1 is a flow chart illustrating a method of operating an ESS with optimal efficiency in accordance with one example embodiment of the present invention.

The method of operating an ESS with optimal efficiency in accordance with the illustrated flow chart may comprise steps of collecting charge/discharge efficiency data of a PCS depending on input/output power values (or target charge/discharge levels) as S10; collecting charge/discharge efficiency data of a battery depending on current state of charge of the battery as S20; creating charge/discharge efficiency data of a unit BESS including the PCS and the battery by using the collected data as S40; determining optimal charge/discharge levels of at least two unit-BESSs included in the ESS by using charge/discharge efficiency data of the at least two unit-BESSs to satisfy input/output power values or commanded values of the whole ESS at a current point of time as a specific point of time as S60; and charging or discharging the at least two unit-BESSs depending on the determined optimal charge/discharge power values as S80.

At the step of collecting charge/discharge efficiency data of the PCS as S10, the charge/discharge efficiency data which may form a linear graph with the input/output power value of the battery of the PCS on one axis and its charge/discharge efficiency level on the other axis may be collected. The 'input/output power value of the battery of the PCS' may be replaced with the target charge/discharge level of the battery and also with the commanded input/output value of an external EMS. Because the charge/discharge efficiency of the PCS slightly fluctuates depending on its service life, the charge/discharge efficiency data of the PCS may be information recorded in a storage space, in which case, the step S10 may be performed in a method of reading the charge/discharge efficiency data of the PCS recorded in a certain storage space.

At the step of collecting charge/discharge efficiency data of the battery as S20, charge/discharge efficiency data which may form a graph in a 3D space with current state of charge (SOC) of the battery on one axis, its target charge/discharge efficiency level on another axis, and its charge/discharge efficiency level on the other axis may be collected.

As the data that may form the graph in the 3D space become too larger to store consecutively (or at detailed steps enough to be considered as consecutive), it is more advantageous to choose a form of discrete data in a method of dividing one of the aforementioned three axes into subsections.

For a more specific example, the charge/discharge efficiency data that may form the graph in the 3D space may have the current-SOC of the battery, i.e., starting SOC (referred to as "current-SOC"), on one axis and its target-SOC, i.e., target SOC, on the other axis. The charge/discharge efficiency may be defined as the power value outputted upon discharge compared to the power value inputted upon charge.

The details of the step of creating charge/discharge efficiency data of the unit-BESSs as S40 will be explained later.

At the step of determining optimal charge/discharge levels of at least two unit-BESSs as S60, optimal charge/discharge levels are determined for the commanded input/output values of the external EMS by using the charge/discharge efficiency data of each of the unit-BESSs which form the ESS. In other words, optimal distribution combinations of the output power values falling under the commanded input/output values to individual BESSs are determined. The step S60 may be also performed in a method of finding a combination with the highest charge/discharge efficiency by simulating and computing all the possible combinations but it is more advantageous to apply an algorithm which may simplify taking into account burdens or computational speed of a processor. One example of the algorithm will be explained later.

At the step of charging or discharging the at least two unit-BESSs as S80, the each unit BESS may be charged or discharged in simultaneous or serial order. In the latter case, it is useful for the ESS with the PCS which is shared with the multiple unit-BESSs.

A course of charging or discharging unit-BESSs with the illustrated optimal charge/discharge level may be performed by unit time and if the course of the charging or discharging unit-BESSs with the optimal charge/discharge level at a current point of time as the specific point of time is completed, the same course may be repeated at a next time. To do this, after charging or discharging the unit-BESSs at S80, a step of receiving input/output power values or commanded values of the whole ESS at the next time and obtaining information on current charge/discharge levels of batteries equipped in the at least two unit-BESSs at the next time may be performed and may return to the step of determining optimal charge/discharge levels of at least two unit-BESSs.

Figure 2:
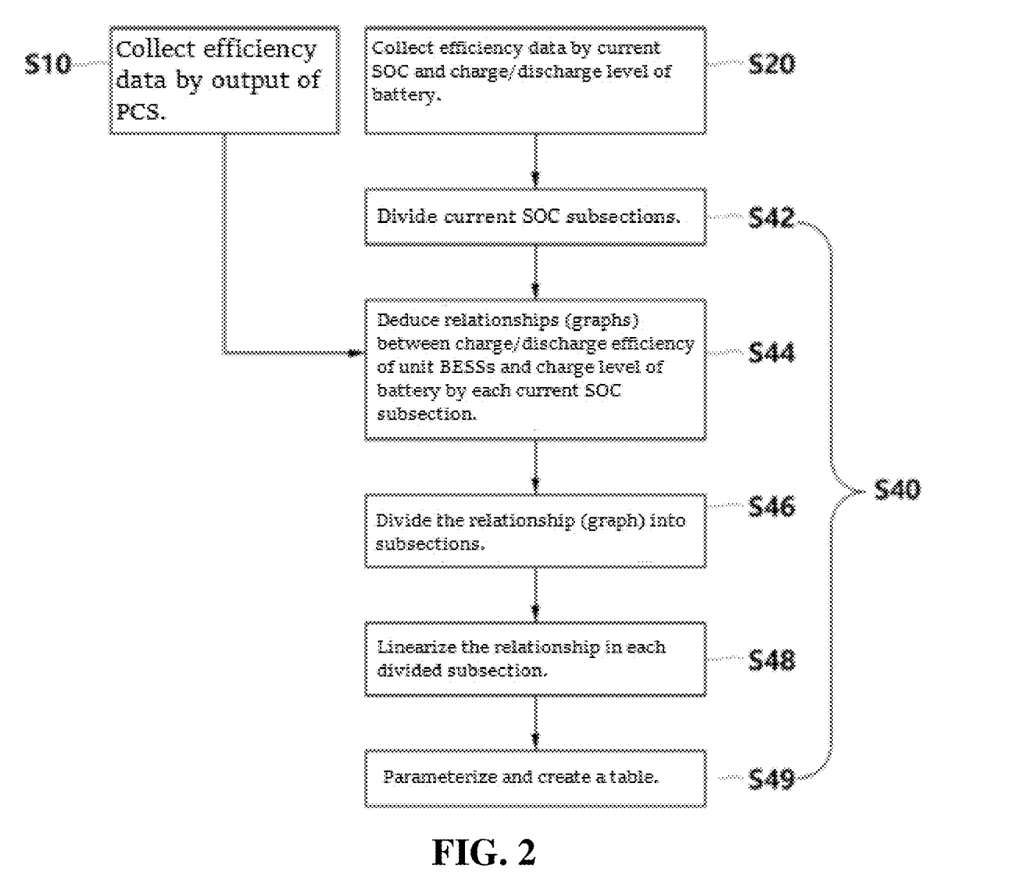
FIG. 2 is a flow chart illustrating a method of creating charge/discharge efficiency data of the ESS that is capable of being included in the method of operating the ESS with optimal efficiency as shown in FIG. 1.

FIG. 2 is a flow chart illustrating a method of creating charge/discharge efficiency data of the ESS that is capable of being included in the method of operating the ESS with optimal efficiency as shown in FIG. 1. Detailed configurations that form the methods of creating charge/discharge efficiency data of the ESS in FIG. 2 may belong to detailed configurations of the method of operating the ESS with optimal efficiency in FIG. 1 or may be more detailed configurations. For example, it can be found out that steps S42 to S49 in FIG. 2 could be the detailed configurations of the step S40 in FIG. 1.

The method of creating the charge/discharge efficiency data of the ESS as illustrated in FIG. 2 is to create the charge/discharge efficiency data of each of the unit-BESSs, equipped in the ESS, each of which is composed of a PCS and a battery.

The method of creating the charge/discharge efficiency data of the ESS as illustrated may comprise steps of: collecting charge/discharge efficiency data of the PCS as S10; collecting charge/discharge efficiency data of a battery depending on current-SOC of the battery as S20; dividing a current-SOC section of the collected charge/discharge efficiency data of the battery into multiple current-SOC subsections as S42; drawing a relationship between SOC of the battery at destination and charge/discharge efficiency of the unit-BESSs by combining a relationship between target-SOC of the battery and charge/discharge efficiency of the battery with that between target-SOC of the battery and charge/discharge efficiency of the PCS in charge of the battery with respect to the individual current-SOC subsections as S44; dividing a charge/discharge efficiency level section in the relationship between target-SOC of the battery and the charge/discharge efficiency of the unit-BESSs into multiple subsections as S46; and linearizing the relationship between target-SOC of the battery and the charge/discharge efficiency of the unit-BESSs in the multiple subsections as S48.

As illustrated in accordance with the embodiment, after the step of linearizing as S48, it may comprise a step of forming a table by parameterizing the linearized straight line as S49. In this case, at the step of determining the optimal charge/discharge levels of at least two unit-BESSs in FIG. 1, optimal charge/discharge levels of the at least two unit-BESSs is determined by using the linearized relationships between the target-SOC of the battery and the charge/discharge efficiency of the unit-BESSs in the multiple subsections with respect to the individual current-SOC subsections corresponding to the current-SOC of the battery at the specific point of time.

Explanation on the focus on reducing data volumes during the aforementioned course is as below. First, large data forming a 3D graph are simplified discretely on a current-SOC axis and then the entire data form multiple 2D linear graphs for individual current-SOC subsections. After that, the individual linear graphs are divided into sections whose graphs could be linearized and the linear graphs for the divided sections are parameterized in gradient-intercept form to secure the computer processing speed while largely lowering total data storage capacity.

The aforementioned course will be explained with examples of definite data.

First, an example of a relationship of efficiency between a battery and a PCS by input/output power of a BESS composed of the battery and the PCS (in case of a 1 MW system) is as shown in Table 1 below.

For example, upon the implementation of the idea of the present invention in the simplest form, the efficiency date of the PCS collected at S10 in FIGS. 1 and 2 may be data in the first and second columns of the table below.

TABLE 1

| Power (kW) | Efficiency of PCS (%) | Efficiency of Battery (%) |
|---|---|---|
| 100 | 88.4 | 98.2 |
| 200 | 93.8 | 97.9 |
| 300 | 95.2 | 97.3 |
| 400 | 96.5 | 96.8 |
| 500 | 96.9 | 96.6 |
| 600 | 97.1 | 96.2 |
| 700 | 97.2 | 95.8 |
| 800 | 97.2 | 95.1 |
| 900 | 97.2 | 94.7 |
| 1000 | 97.2 | 94.5 |

Figure 3:
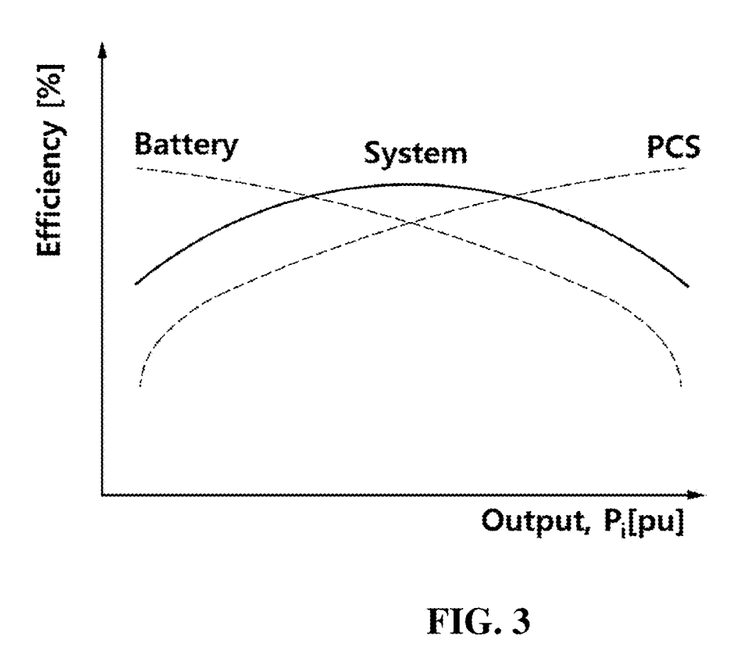
FIG. 3 is a graph expressing a relationship of efficiency between a battery and a PCS.

In general, the relationships of efficiency levels between the battery and the PCS from Table 1 above are expressed in graphs as shown in FIG. 3.

In FIG. 3, a control variable is Xi which represents the output of each BESS while a sign (+) means discharge and a sign (−) means charge.

It can be found out that the efficiency by SOC upon charging in the illustrated graph is similar and largely depends on the output and power tends to be distributed with a similar charge level and that upon discharge, when the SOC is lower, the efficiency is higher and the discharge tends to be distributed in center of BESSs which have lower SOC.

The parameters meaning energy efficiency levels depending on SOC and output of each BESS are as shown in Equation 1 below.

Upon charge: $\alpha_i = \eta_i(SOC_i, X_i)$

Upon discharge: $\alpha_i = 1/\eta_i(SOC_i, X_i)$ [Equation 1]

The efficiency by output (e.g., battery discharge) of each unit BESS has the maximum value in the intermediate area of the graph as shown in FIG. 3 but the graph is just based on the extremely simplified basic assumption. For example, the efficiency levels of the PCS may be changed depending on power values and/or loads and also on environmental conditions of a site. Besides, in case of the efficiency of the battery, for example, the charge/discharge efficiency of the battery may be changed even depending on the current-SOC level as the current charge level of the battery that forms the unit-BESSs. Accordingly, the application of the optimal algorithm is required in consideration of the SOC and the efficiency.

Figure 4:
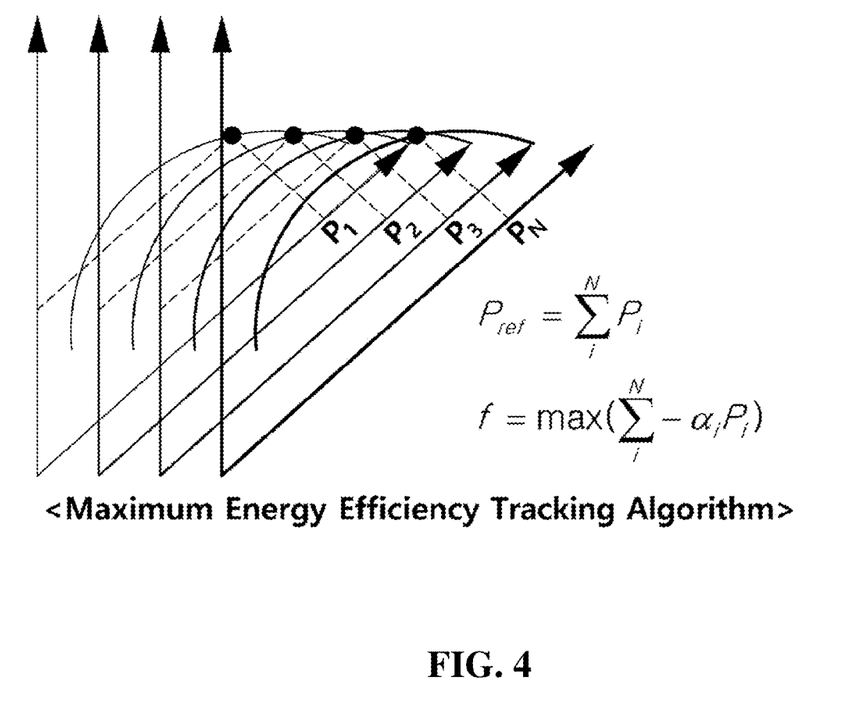
FIG. 4 is a graph showing a principle of a Maximum Energy Efficiency Tracking Algorithm or MEET with multiple objective functions.

There is Maximum Energy Efficiency Tracking Algorithm (MEET) as an optimal distribution algorithm in consideration of the efficiency. FIG. 4 is a graph showing a principle of MEET with multiple objective functions. As illustrated, an optimal power distribution combination can be found by applying a lot of power functions.

In accordance with the present invention, a course of obtaining an optimal distribution functions (with the MEET) considering the efficiency of the battery and the PCS will be explained.

The objective functions to find optimal distribution combinations of the ESS composed of unit-BESSs, which have parameters based on the Equation 1 above and have battery efficiency curve following the graph pattern shown in FIG. 3, are as seen in Equation 2 below.

$f = \max(\Sigma_i^N -a_i \times X_i) = \min(\Sigma_i^N a_i \times X_i)$ [Equation 2]

The maximum charged energy in the battery:

$f = \min(\Sigma_i^N a_i \times X_i), X_i:(-)$

The minimum discharged energy in the battery:

$f = \max(\Sigma_i^N -a_i \times X_i) X_i:(+)$

From the equation above, it can be found out that the objective functions upon charge/discharge have dual relationships.

Meanwhile, constraints on the objective functions are as shown in Equation 3.

Total output: $\Sigma_t^N X_i = P_{ref} = P_{BP} + P_{AGC} + P_{GFC}$ [Equation 3]

Rated output constraint of each ESS: $-P_{rate} \leq X_i \leq P_{rate}$

Next, a detailed solution to acquire $\alpha_i$ from the Equation 2 shown above will be explained.

Figure 5:
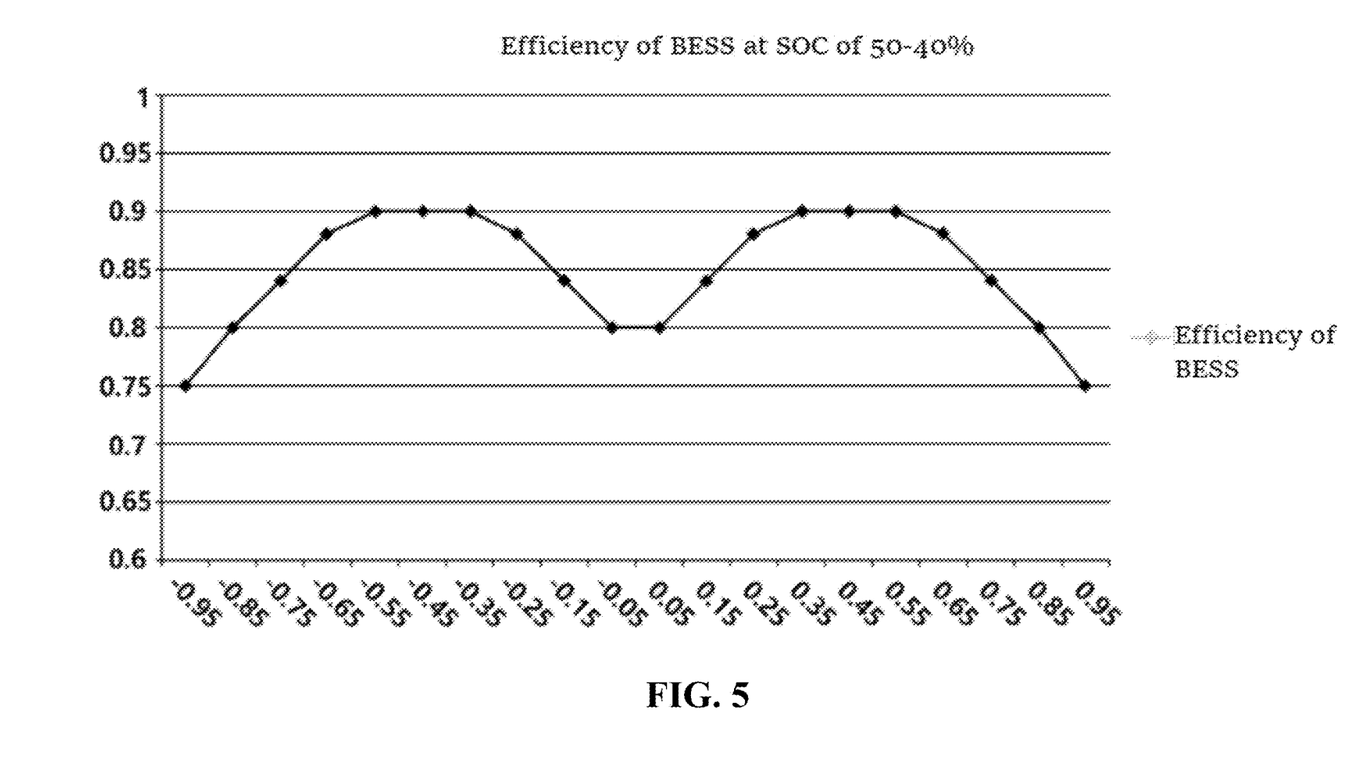
FIG. 5 is a graph of efficiency simplified in a line when current-SOC of a battery is in a section between 50% and 40%.
Figure 6:
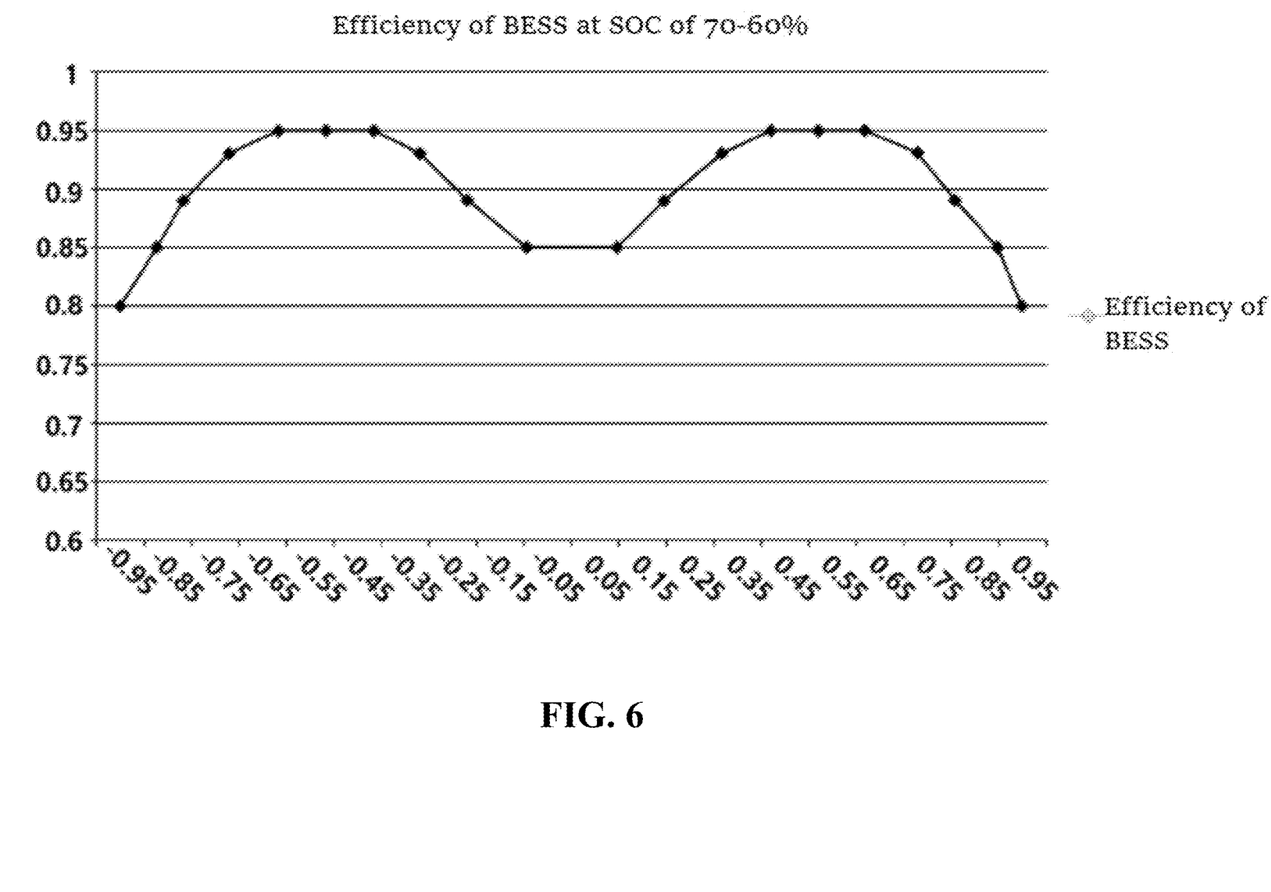
FIG. 6 is a graph of efficiency simplified in a line when current-SOC of a battery is in a section between 70% and 60%.

FIG. 5 is a graph of efficiency simplified in a line when current-SOC of a battery is in a section between 50% and 40% and FIG. 6 is a graph of efficiency simplified in a line when current-SOC of a battery is in a section between 70% and 60%. In other words, the relationship of charge/discharge efficiency of the battery changed depending on the current-SOC value of the battery may be expressed in a standardized efficiency graph for each of the current-SOC subsections at an interval of 10%.

As illustrated in FIGS. 5 and 6, even though the standardized or simplified graph is used with the current-SOC subsections, even the standardized graph of the each current-SOC subsection itself has a pattern that may be defined by using multidimensional functions with complicated shapes in entirety. When multidimensional functions that can define the aforementioned patterns are used, it is difficult to obtain real-time optimal distribution due to a lot of computations to obtain energy efficiency $\alpha_i$.

To overcome this, in accordance with the present invention, a graph of a pattern that can be defined by using the multidimensional functions as relationships between the target-SOC of the battery and the charge/discharge efficiency of the unit BESS with the battery in the current-SOC subsections can be linearized.

Figure 7:
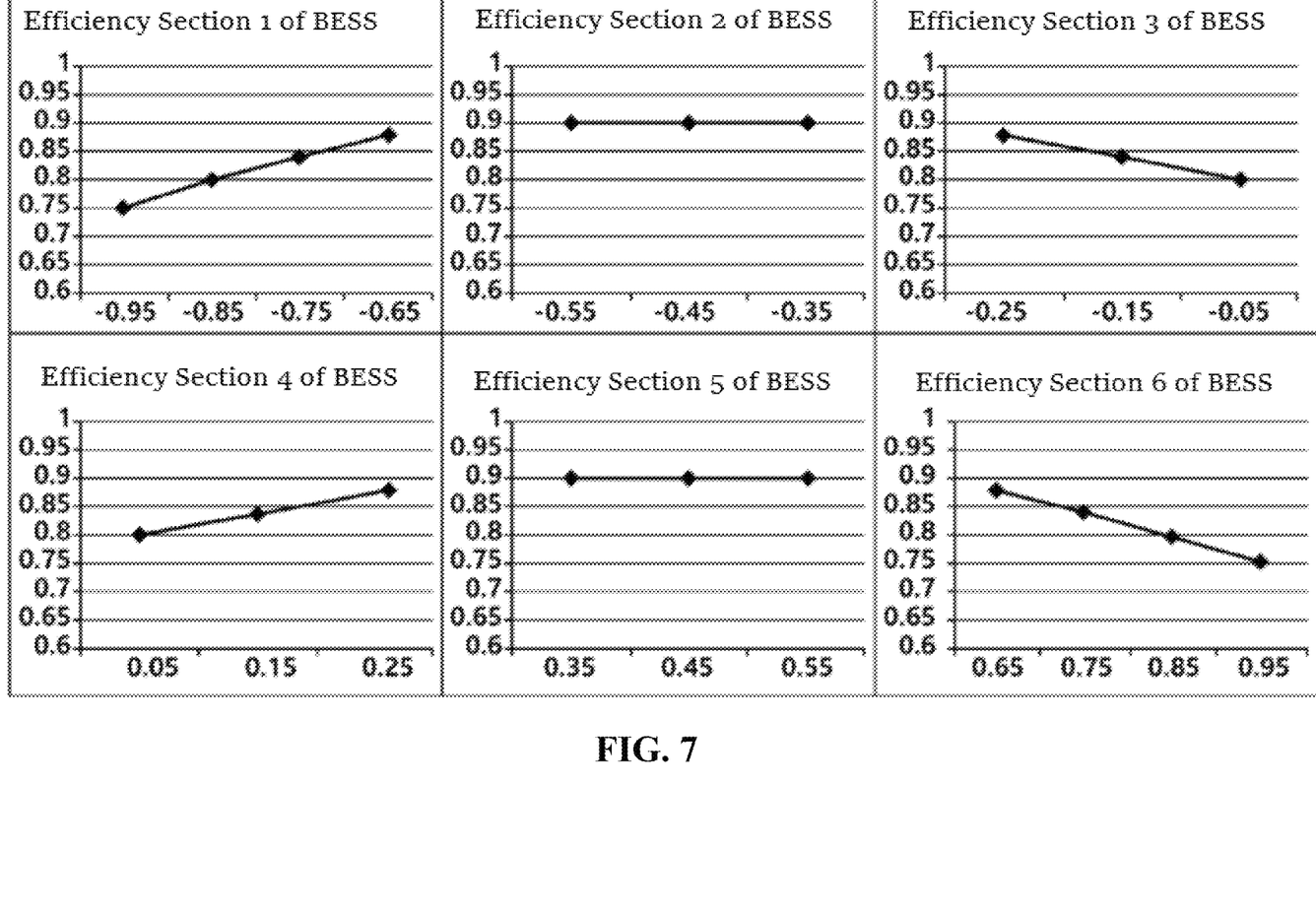
FIG. 7 is a drawing illustrating graphs of a linearized graph pattern in FIG. 5 by dividing the section into six subsections.
Figure 8:
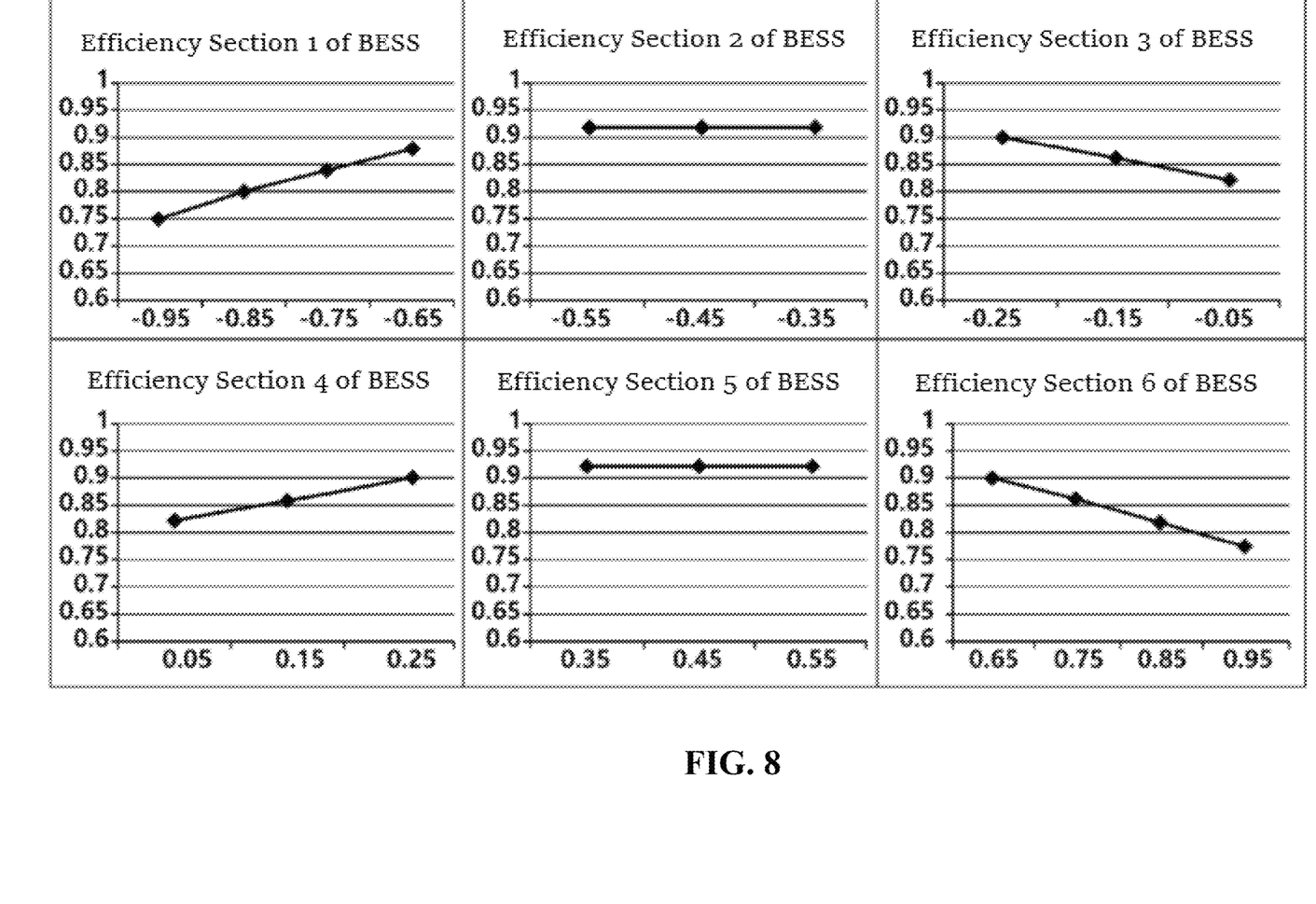
FIG. 8 is a drawing illustrating graphs of a linearized graph pattern in FIG. 6 by dividing the section into six subsections.

FIG. 7 illustrates a linearized the graph pattern in FIG. 5 by dividing the section into six subsections and FIG. 8 illustrates a linearized graph pattern in FIG. 6 by dividing the section into six subsections.

Upon linearizing, the straight line in each subsection can be defined only with a gradient and an intercept and only each value may be stored even in a memory. Table 2 below represents a table of parameterized charge/discharge efficiency data of the unit-BESSs with the gradients and intercepts of the approximate linear functions.

TABLE 2

| | Section 1 | | Section 2 | | Section 3 | | Section 4 | | Section 5 | | Section 6 | |
|---|---|---|---|---|---|---|---|---|---|---|---|---|
| SOC | a | b | a | b | a | b | a | b | a | b | a | b |
| 0.95 | 0.522488 | 1.147151 | 0.015512 | 0.823996 | −0.51985 | 0.683035 | −0.77118 | 1.577159 | −0.11867 | 1.40505 | 0.135803 | 1.253927 |
| 0.85 | 0.511529 | 1.144873 | 0.026084 | 0.834651 | −0.51892 | 0.689749 | −0.6957 | 1.478698 | −0.07698 | 1.321217 | 0.088753 | 1.224765 |
| 0.75 | 0.4875 | 1.1319 | 0.0372 | 0.8425 | −0.3995 | 0.7231 | −0.4375 | 1.3468 | −0.0399 | 1.2500 | 0.0526 | 1.1982 |
| 0.65 | 0.4634 | 1.1204 | 0.0402 | 0.8458 | −0.3971 | 0.7261 | −0.4068 | 1.2794 | −0.0189 | 1.1911 | 0.0228 | 1.1681 |
| 0.55 | 0.4343 | 1.1078 | 0.0287 | 0.8447 | −0.3842 | 0.7342 | −0.3915 | 1.2395 | 0.2037 | 1.0470 | 0.0621 | 1.1230 |
| 0.45 | 0.4112 | 1.0970 | 0.02522 | 0.8462 | −0.3885 | 0.7376 | −0.4316 | 1.2398 | 0.2076 | 1.0493 | 0.0480 | 1.1423 |
| 0.35 | 0.3881 | 1.0860 | 0.03060 | 0.8518 | −0.3885 | 0.7422 | −0.4639 | 1.2381 | 0.2105 | 1.0519 | 0.0338 | 1.1621 |
| 0.25 | 0.296472 | 1.005053 | 0.016621 | 0.847693 | −0.92508 | 0.61463 | −0.4957 | 1.236382 | 0.213467 | 1.054614 | 0.018969 | 1.182559 |

$\alpha_i$ can be obtained in the section-linearized subsections by using the gradient $a_k$ and intercept $b_k$ through Equation 4 below.

$$\alpha_i = a_k \times X_i + b_k \quad \text{[Equation 4]}$$

An optimal solution from systems under a configuration in which a PMS calculates commanded output values of two ESSCs and/or the other configuration in which the ESSC calculates commanded output values of two PCSs in the aforementioned courses can be obtained through Equation 5 below.

$$L = (a_1 X_1^2 + b_1 X_1 + a_2 X_2^2 + b_2 X_2) + \lambda(P_{ref} - X_1 - X_2) \quad \text{[Equation 5]}$$

$$\frac{dL}{dX_1} = \frac{dL}{dX_2} : \frac{dL}{dX_1} = 2a_1 X_1 + b_1 - \lambda = 0,$$

$$\frac{dL}{dX_2} = 2a_2 X_2 + b_2 - \lambda = 0$$

Simultaneous Equation $$2a_1 X_1 + b_1 = 2a_2 X_2 + b_2 = \lambda$$

$$X_1 + X_2 = P_{ref}$$

Solution of the Simultaneous Equation $$X_1 = \max\left(\min\left(\frac{b_2 - b_1 + 2a_2 P_{ref}}{2a_1 + 2a_2}, P_{max}\right), P_{min}\right),$$

$$X_2 = \max(\min(P_{ref} - X_1, P_{max}), P_{min})$$

Even a course of obtaining the aforementioned optimal solution may be simplified by dividing the current-SOC section as explained above and then dividing input/output sections again. First of all, current-SOC subsections to which the current-SOC of the two ESSCs or the PCSs (which refer to unit-BESSs in the explanation of FIG. 1) are confirmed. Then, 36 combinations of current-SOC subsections (which 6^2=36 as the maximum number of cases, i.e., configured with 2 current-SOC subsections) can be obtained because the output sections of each unit are divided into six. A combination which has the most optimal efficiency level may be selected by performing individual calculation of efficiency for the 36 combinations. At the time, efficiency calculation may be performed by using representative levels for the individual sections.

For example, through this course, optimal combinations composed of two current-SOC subsections as shown in Table 3 below may be selected.

TABLE 3

| | Section 1 | | Section 2 | | Section 3 | | Section 4 | | Section 5 | | Section 6 | |
|---|---|---|---|---|---|---|---|---|---|---|---|---|
| SOC | a | b | a | b | a | b | a | b | a | b | a | b |
| 0.65 | 0.4331 | 1.1116 | 0.0001 | 0.8500 | −0.4000 | 0.7300 | −0.5680 | 1.2284 | 0.0008 | 1.0611 | 0.6453 | 0.6668 |
| 0.45 | 0.4333 | 1.1616 | 0.00011 | 0.9000 | −0.4001 | 0.7800 | −0.5682 | 1.2784 | 0.0009 | 1.1111 | 0.6455 | 0.7168 |

The more optimal target-SOC value may be determined by applying the a-b levels, which are the selected optimal combinations, to the aforementioned Equation 5.

It is advantageous to obtain the optimal solution by using the aforementioned method because it is possible to deduce the solution faster than existing FOR loop as such optimal solution can be easily obtained mathematically and also because it is possible to deduce it by changing the method to an existing method for obtaining a dispatch solution in case of at least two N systems.

In case of the Table 3 above, it shows the results of the application of the MEET for condition of Pref: 0.3 MW, SOC(X1): 65%, SOC(X2): 45% in accordance with the present invention.

In general, the algorithm for output distribution by SOC (comparator technology) has an advantage of easy energy management by making X1 with a higher SOC discharge more than X2 and collecting multiple batteries with the same SOC on a long-term operation but it does not have optimal energy efficiency.

On the contrary, the algorithm for output distribution by the MEET In accordance with the present invention makes X2 with lower SOC and higher energy efficiency discharge more than X1 and improves energy efficiency, thereby increasing operating time.

The energy saving effects of both output distribution by SOC and that by the MEET in different operating conditions are as shown in Table 4 below.

TABLE 4

| Classification | Starting SOC | Ending SOC | Residual Energy |
|---|---|---|---|
| Distribution by SOC | 60%, 40% | 18.2%, 11.5% | 148.5 kWh |
| Distribution by Efficiency | | 20.2%, 14.8% | 175 kWh |
| Total Operating Amount/ Reduction Amount | | 260 kWh/26.5 kWh (Effective operation by 10%) | |

Figure 9:
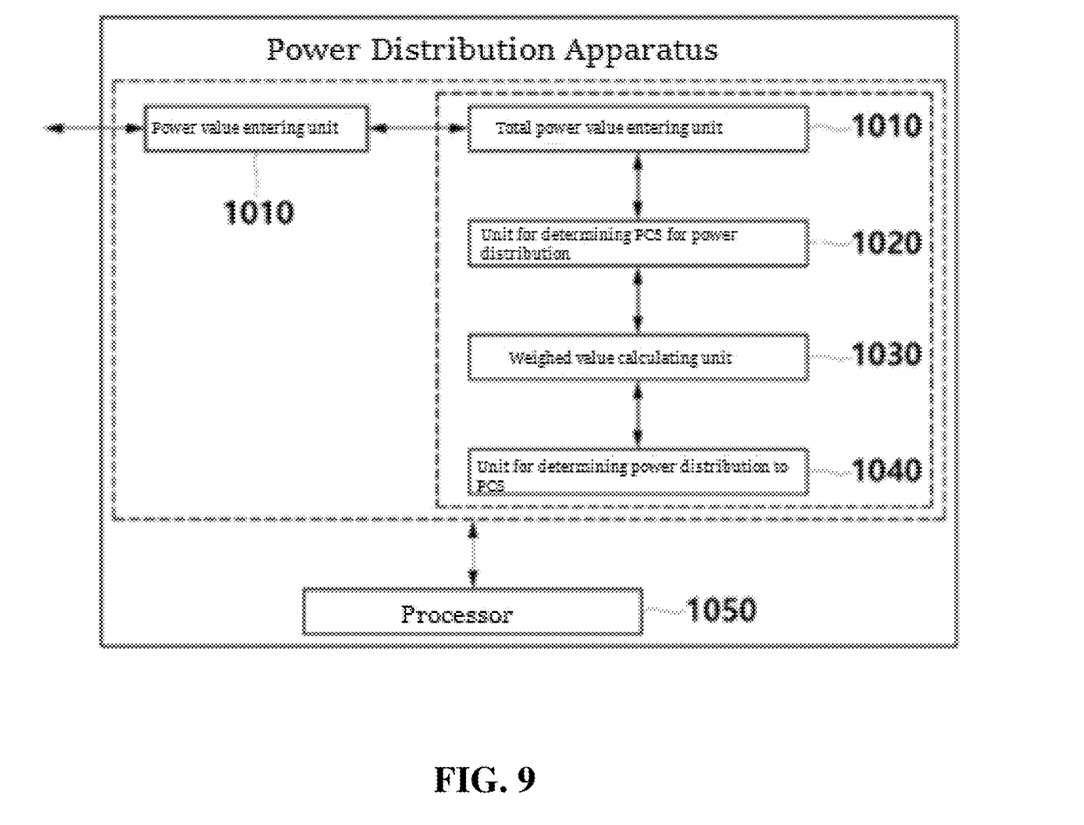
FIG. 9 is a conceptual diagram of an apparatus of performing power distribution in accordance with an example embodiment of the present invention in an EES composed of at least two unit-BESSs, each of which equips one unit-battery block and one PCS.

FIG. 9 is a conceptual diagram of an apparatus of performing power distribution in accordance with an example embodiment of the present invention in an EES composed of at least two unit-BESSs, each of which has one unit-battery block and one PCS.

By referring to FIG. 9, a power distribution apparatus may include a power value entering unit 1000, a total power value calculating unit 1010, a unit 1020 for determining BESS for power distribution, a unit 1040 for determining distributed power to BESS, and a processor 1050.

The power value entering unit 1000 may receive information on a target power value for new output, i.e., a commanded input/output value. The power value entering unit 1000 may receive information on the target power value for the new output to perform power distribution to each BESS.

The total power value calculating unit 1010 may be implemented to calculate a total power value based on the target power value for new output received by the power value entering unit 1000 and additionally received deviation. The deviation may be calculated based on information on difference between the target power value for output which has been already entered and the total power value stored in the whole ESS. The total power value calculating unit 1010 may calculate the total power value required for the current whole ESS taking into account the deviation, as the difference between the total power value that has been already received and the target power value for output that has been already received, and newly received new target output.

The unit 1040 for determining distributed power to BESS may determine a distribution power value for each unit BESS by applying an algorithm using current-SOC of a battery of each unit BESS included in the ESS. In other words, as explained above, it may determine an optimal power distribution volume based on the current-SOC in accordance with the present invention. The unit 1040 for determining distributed power to PCS may distribute power to each PCS after the determination.

In accordance with the implementation, the unit 1020 for determining BESS for power distribution which determines a unit BESS to distribute power to by determining SOC of each unit BESS included in the whole ESS may be further included. For example, the unit 1020 for determining BESS for power distribution may perform charging only to unit-BESSs which exist in chargeable scope y determining the SOC of the battery of the each unit BESS. For example, separate power distribution may not be performed to unit-BESSs whose SOC is in a certain scope of 90~100%. In this case, the unit-BESSs may be excluded from target unit-BESSs to which power is distributed.

The processor 1050 may control operation of the power value entering unit 1000, the total power value calculating unit 1010, the unit 1020 for determining BESS for power distribution, and the unit 1040 for determining distributed power to BESS.

It must be noted that the aforementioned example embodiments are just for explanation and not for limitation. In addition, those skilled in the art to which the present invention pertains could understand that various example embodiments may be formed in the scope of the technical idea of the present invention.

REFERENCE NUMERALS

1000: Power volume entering unit
1010: Total power value calculating unit
1020: Unit for determining BESS for power distribution
1040: Unit for determining distributed power to BESS
1050: Processor

INDUSTRIAL AVAILABILITY

The present invention relates to a method of operating an ESS, and is available in an ESS using batteries.

What is claimed is:

1. A method of operating an energy storage system (ESS) with optimal efficiency, comprising the steps of:
   collecting charge/discharge efficiency data of a power conditioning system (PCS);
   collecting charge/discharge efficiency data of a battery depending on a current state of charge of the battery;
   creating charge/discharge efficiency data of a unit-battery energy storage system (BESS) including the PCS and the battery by using the collected charge/discharge efficiency data of the PCS;
   determining optimal charge/discharge levels of at least two unit-BESSs included in the ESS by using charge/discharge efficiency data of the at least two unit-BESSs to satisfy commanded input/output power values of the whole ESS at a current point of time; and
   charging or discharging the at least two unit-BESSs depending on determined optimal charge/discharge power values,
   wherein the step of creating charge/discharge efficiency data of the unit-BESS includes:
   dividing a current-state of charge (SOC) section of the battery included in each of the at least two unit-BESSs into multiple current-SOC subsections; and
   drawing relationships between a target-SOC of the battery and charge/discharge efficiency of the each unit BESS by combining a relationship between the target-SOC of the battery and the charge/discharge efficiency of the battery with that between the target-SOC of the battery and charge/discharge efficiency of the PCS in charge of the battery with respect to the individual current-SOC subsections.

2. The method of claim 1, wherein, after the step of charging or discharging the unit-BESSs, a step of receiving input/output power values of the whole ESS at a next time and obtaining information on current charge/discharge levels of batteries equipped in the at least two unit-BESSs at the next time is performed and returns to the step of determining optimal charge/discharge levels of at least two unit-BESSs.

3. The method of claim 1, wherein the step of creating the charge/discharge efficiency data of the unit BESS further includes:
   dividing a charge/discharge efficiency level section in the relationships between the target-SOC of the battery and the charge/discharge efficiency of the unit-BESSs into multiple subsections; and
   linearizing the relationships between the target-SOC of the battery and the charge/discharge efficiency of the unit-BESSs in the divided multiple subsections.

4. The method of claim 3, wherein at the step of determining the optimal charge/discharge levels of the at least two unit-BESSs, optimal charge/discharge levels of the at least two unit-BESSs are determined by using the linearized relationships between the target-SOC of the battery and the charge/discharge efficiency of the unit-BESSs in the divided multiple subsections with respect to the individual current-SOC subsections corresponding to the current-SOC of the battery at a specific point of time.

5. The method of claim 3, further including a step of:
   receiving input/output power values of the whole ESS at a current point of time and obtaining information on current charge/discharge levels of batteries equipped in the at least two unit-BESSs at the current point of time.

* * * * *